United States Patent Office 3,456,034
Patented July 15, 1969

3,456,034
ETHYLENE ALKYLATION WITH ALUMINUM FLUORIDE SUPPORTED ON SILICA-ALUMINA GEL
Robert A. Sanford, Homewood, and Frank J. Chloupek, South Holland, Ill., assignors to Sinclair Research, Inc., New York, N.Y., a corporation of Delaware
No Drawing. Filed Oct. 29, 1965, Ser. No. 505,732
Int. Cl. C07c 3/56; B01j 11/78
U.S. Cl. 260—683.53                            2 Claims

ABSTRACT OF THE DISCLOSURE

A process of alkylating paraffinic hydrocarbons containing from about 3 to 6 carbon atoms with an olefin containing from about 2 to 8 carbon atoms at a temperature in the range of about 50 to 1000° F. in the presence of a catalyst containing a minor amount of aluminum fluoride supported on silica-alumina, preferably synthetic gel silica-alumina.

---

The present invention relates to an improved alkylation process and catalysts used for this process. More particularly, the invention concerns the alkylation of paraffinic hydrocarbons with olefins using an aluminum fluoride-silica-alumina catalyst to produce paraffins of higher molecular weight.

Commercially, the process of paraffin-alkylation is generally catalyzed in the liquid phase with either hydrofluoric acid, sulphuric acid, or aluminum chloride. However, these catalysts suffer from several deficiencies. Present alkylation processes using these acid catalysts require refrigeration to minimize undesirable side reactions, and there is a problem in handling because the acids must generally be regenerated in another location. Further, the conversion and selectivity of the olefins to the alkylates have not been satisfactory.

The infeasibility of fixed-bed alkylation to date has stemmed from a lack of suitable catalysts to selectively catalyze the reaction, and along with other problems, an inability to regenerate effectively the few catalysts such as resins and Friedel-Crafts complexes which will promote this reaction. The foregoing factors, among others, are responsible for the high operating costs and undesirable results associated with the present type of liquid and solid phase paraffin-alkylations. Accordingly, there is a need for an improved alkylation catalyst system.

It is desired by the present invention to provide a catalytic alkylation process for producing desirable gasoline boiling range hydrocarbons. Advantageously the catalyst system used for this process can be easily regenerated. The alkylation catalyst system of the present invention also improves both the conversion and selectivity of olefins to alkylate per pass. Further scope of applicability of the present invention will become apparent from the detailed description given below.

In the present invention, it has been found that the above-mentioned disadvantages may be eliminated and a much improved process for the alkylation of paraffins with olefins may be obtained, by reacting at least one paraffin either straight or branched-chain with at least one olefin either branched or straight-chained, preferably a mono-olefin, to produce paraffins of higher molecular weight; the said reaction being catalyzed by the presence of an aluminum fluoride-silica-alumina catalyst in a fixed, moving or fluidized catalyst system. It has now been found that by using an aluminum fluoride-silica-alumina catalyst, excellent selectivity in catalyzing the reaction to form the alkylate can be achieved together with an improved conversion on olefins to alkylate per pass. Thus, a paraffinic alkylation process using this catalyst system gives products which are generally highly branched, and with suitable starting material, will afford desirable gasoline range hydrocarbons and other specific products of petrochemical value.

The silica-alumina portion of the catalyst of the instant invention can be a natural silica-alumina or a synthetic type of silica-alumina and can be used as a hydrogel, xerogel or even calcined to an activated state often at a temperature of 800°–1300° F., or more. The catalyst generally includes a minor amount of alumina, for instance, about 1 to 40, preferably about 10 to 35 weight percent alumina based on the silica. Popular synthetic gel silica-alumina generally contains about 10 to 30% alumina. Two such catalysts are "Aerocat" which contains about 13% $Al_2O_3$ and "high alumina Nalcat" which contains about 25% $Al_2O_3$, with substantially the balance being silica. The silica-alumina may be only partially of synthetic material, e.g., as may be made by precipitation of silica-alumina on an activated clay. One example of such silica-alumina contains about equal amounts of silica, alumina gel and clay. The preferred silica-alumina is synthetic gel silica-alumina and contains at least about 50% silica and usually at least about 50 to 90% silica based on the weight of the catalyst. The silica alumina catalysts of the instant invention can also contain minor amounts of other materials such as magnesia, zirconia, etc.

The catalyst employed in the process of the present invention can be easily regenerated employing conventional procedures, for instance, by subjecting it to an oxygen-containing gas at a temperature sufficient to burn off carbon deposited on the catalyst during the alkylation. This oxygen-containing gas, e.g., an oxygen-nitrogen mixture, often contains about 0.01 weight percent to 5 weight percent oxygen but preferably contains about 0.5 to 1.5 weight percent oxygen and may be introduced at a flowrate such that the maximum temperature at the site of combustion is below about 1000° F.

The alkylation process of the present invention generally involves contacting the feed with catalyst in the form of rough granules or a powder, or as compressed tablets, extruded pellets or the like, ranging in size from about $1/32''$ to $1/2''$ in diameter and from about $1/16''$ to $1''$ in length. Fixed, moving or fluidized catalyst bed reactors may be used, and the process may be conducted continuously or batchwise, by methods well known in the art.

In accordance with the present invention, the aluminum fluoride-silica-alumina catalysts are advantageously employed to enhance the alkylation paraffinic hydrocarbons with olefinic materials. Although isoparaffins and mixtures thereof are the preferred hydrocarbons that can be alkylated, n-paraffins and mixtures thereof or mixtures of n-paraffins with isoparaffins can also serve as a feedstock. As examples of the paraffinic hydrocarbons that can be alkylated, there can be mentioned any of the paraffins or isoparaffins containing from about 3 to 6 carbon atoms, preferably about 3 to 4 carbon atoms, such as, for example, propane, n-butane, isobutane, n-pentane, isopentane, etc.

The alkylating agents suitable for use in the present process are olefins, generally containing from about 2 to 8 carbon atoms, preferably from about 2 to 4 carbon atoms. Alpha-mono olefins are preferred and these include ethylene, propylene, butylene, isobutylene, etc.

The particular process conditions of temperature, pressure, residence time, etc., employed in effecting the alkylation may vary and are sufficient to cause alkylation of the particular materials being utilized.

Frequently, in the process of the present invention, temperatures ranging from about 50 to about 1000° F., may be suitable; however, temperatures in the range of about 300° F., to 900° F., are generally preferred.

The pressure employed in the exercise of the present invention can vary widely. Alkylation with the less volatile olefin can be effected at atmospheric pressure (ambient pressure) or lower, if desired. However, with normally gaseous olefins or with normally gaseous or low boiling isoparaffins, super atmospheric pressure is generally used in order to provide an adequate concentration of reactants to contact the catalyst under reaction conditions. A pressure range of about 0.10 to 100 atmospheres have been found to be generally sufficient. However, a range of about 1 atmosphere to 25 atmospheres is preferred.

The paraffinic space velocity, in most cases, will be from about 0.05 to 10, preferably from about 0.25 to 4, weight of paraffin per weight of catalyst per hour (WHSV). The paraffinic hydrocarbon is generally employed in a molar ratio to the alkylating agent of about 1/1 to about 100/1 and preferably of about 2/1 to about 10/1. Diluent gases, e.g., inert or hydrocarbon such as hydrogen, nitrogen and methane can also be utilized in the present process usually in the amounts ranging from a diluent gas to alkylating agent molar ratio of about 0.01/1 to about 20/1 or more, preferably about 2/1 to about 10/1.

Fundamentally, the alkylation reaction is a vapor phase process. However, under certain reaction conditions where a proper choice of reactants has been made it may be possible and at times desirable to carry out the reaction in the liquid phase. Ordinarily, however, vapor phase reaction is preferred. The following examples are given only for the purpose of illustrating the invention and are not to be considered as limiting.

EXAMPLE I

In producing the catalysts of the present process, 500 grams of a commercial spray dried, microspherical low alumina, silica-alumina (about 12% $Al_2O_3$), synthetic cracking catalyst (12.97% volatile at 1000° C.), is mixed with 72 grams aluminum fluoride powder, 10 grams of soluble starch, and 15 grams of methyl cellulose. To this mixture is added 463 grams of an alumina monohydrate slurry containing 10.80% $Al_2O_3$, and 375 ml. of deionized water in small portions to form a dough which is then extruded to pellets 1/16 in. in diameter. The alumina serves to aid the extrusion. The extrudate is dried overnight in a forced air drying oven at 230° F., subdivided to less than about 3/8 inch lengths and separated from the fines by screening on a standard 14 mesh sieve. The extrudate is then calcined in a muffle furnace at about 200° F. for 1 hour and 1050° F. for about 3 hours. 351 grams of $SiO_2/Al_2O_3/AlF_3$ extrudate (4.78% volatile at 1000° C.) was recovered containing 4.36% fluorine. In producing these catalysts, silica-alumina can be combined with a minor, catalytic amount of aluminum fluoride to obtain a composite which after drying and calcining to an activated state, often has an $AlF_3$ content of from about 0.50 to 30% by weight, preferably about 5 to 10%.

EXAMPLE II 10 grams of a fluorided Davison low alumina cracking catalyst (silica-alumina) containing 4.36% fluorine is charged to a 10 mm. O.D. Pyrex tube reactor. The reactor is inserted into a tube furnace and heated to about 900° F., under nitrogen purge. The feed, which is a mixture of isobutane and ethylene, is introduced into the Pyrex reactor tube containing the alkylation reaction catalyst, at a paraffin to olefin mole ratio of 2 to 1 and a WHSV (weight of paraffin per weight of catalyst per hour) of 0.25. The alkylation reaction is conducted at a temperature of about 900° F., and a pressure of 1 atmosphere, with the effluent product being measured by gas phase chromatography. The test results are in Table I.

It is apparent from the data in Table I that the use of a fluorided silica-alumina catalyst in the alkylation of paraffinic hydrocarbons resulted in an alkylate yield of almost 60% with about a 60% selectivity for the formation of isopentane.

Table I.—Example I

| | |
|---|---|
| Catalyst | $SiO_2/Al_2O_3/F$ |
| Percent F on catalyst | 4.36 |
| Conditions: | |
| Temp. (° F.) | 900 |
| Pressure (atm.) | 1 |
| WHSV | 0.25 |
| Paraffin | Isobutane |
| Olefin | Ethylene |
| Par/ole. mole ratio | 2 |
| Results: | |
| Percent alkylate yield | 58.0 |
| Selectivity to: | |
| i-Pentane | 59.4 |
| 3-methylpentane | 3.1 |
| 2-methylpentane | 5.4 |
| $C_4=+$ | 32.1 |

It is claimed:

1. An alkylation process which consists essentially of reacting an alkylatable paraffinic hydrocarbon containing from 3 to 4 carbon atoms with ethylene under alkylation conditions including a temperature in the range of about 300 to 900° F. and a pressure of about 1 to 25 atmospheres in the presence of a catalyst consisting essentially of a minor, catalytic amount of aluminum fluoride supported on synthetic gel silica-alumina, said catalyst containing from about 5 to 10 percent by weight aluminum fluoride.

2. An alkylation process which consists essentially of reacting isobutane with ethylene under alkylation conditions including a temperature in the range of about 300 to 900° F. and a pressure of about 1 to 25 atmospheres in the presence of a catalyst consisting essentially of aluminum fluoride supported on synthetic gel silica-alumina, said catalyst containing from about 5 to 10 percent by weight aluminum fluoride to produce an alkylate having a high selectivity to isopentane.

References Cited

UNITED STATES PATENTS

| | | | |
|---|---|---|---|
| 2,195,747 | 4/1940 | Keunecke et al. | |
| 3,084,204 | 4/1963 | Domash et al. | |
| 2,304,290 | 12/1942 | Peski | 260—683.53 |
| 2,347,790 | 5/1944 | O'Kelly et al. | 260—683.47 |

FOREIGN PATENTS 728,279   4/1953   Great Britain.

DELBERT E. GANTZ, Primary Examiner

C. J. CRASANAKIS, Assistant Examiner

U.S. Cl. X.R.

252—442